Dec. 26, 1950     J. T. FERRY     2,535,125

PERFORATED RECORD CARD

Filed Nov. 9, 1945     6 Sheets-Sheet 1

INVENTOR
JOHN T. FERRY
BY *John L. Sterling*
ATTORNEY

Dec. 26, 1950 J. T. FERRY 2,535,125
PERFORATED RECORD CARD
Filed Nov. 9, 1945 6 Sheets-Sheet 2

INVENTOR
JOHN T. FERRY
BY John L. Sterling
ATTORNEY

Dec. 26, 1950  J. T. FERRY  2,535,125
PERFORATED RECORD CARD
Filed Nov. 9, 1945  6 Sheets-Sheet 3

INVENTOR
JOHN T. FERRY
BY John L. Sterling
ATTORNEY

Dec. 26, 1950 J. T. FERRY 2,535,125
PERFORATED RECORD CARD
Filed Nov. 9, 1945 6 Sheets-Sheet 4

*INVENTOR.*
JOHN T. FERRY
BY
*ATTORNEY*

Dec. 26, 1950   J. T. FERRY   2,535,125
PERFORATED RECORD CARD
Filed Nov. 9, 1945   6 Sheets-Sheet 6

FIG.14

INVENTOR.
JOHN T. FERRY
BY *John L. Sterling*
ATTORNEY

Patented Dec. 26, 1950

2,535,125

UNITED STATES PATENT OFFICE 2,535,125

PERFORATED RECORD CARD

John T. Ferry, Brooklyn, N. Y., assignor to Remington Rand Inc., Buffalo, N. Y., a corporation of Delaware Application November 9, 1945, Serial No. 627,610

10 Claims. (Cl. 235—61.12)

This invention relates to perforated cards and to a mechanism for sensing the perforations in the cards as used particularly in card controlled business machines.

At the present time, cards employed in the control of business machines are distinguished by perforations of circular or rectangular shape arranged in horizontal rows of data index positions forming vertical columns. In the standard round hole card, each horizontal row presents index positions for forty-five holes, while a card perforated with rectangular holes or slots presents index positions for eighty holes in each row. The index positions in each horizontal row form vertical columns of twelve positions per column. The slots, in the direction of their length are aligned in vertical columns, and in the direction of their width are aligned in horizontal rows. The difference between the width of the slot and the diameter of the round hole accounts for the greater capacity of a slotted card in horizontal row direction. It also makes the spacings of the round holes and slotted holes in a row relatively different, so that the different types of cards require differently spaced sensing mechanisms for the interpretation of the data punched therein.

Millions of round hole cards and millions of slot-shaped hole cards are in commercial use, and each type controls different mechanism to do the same work. A user of slotted cards is confined to the use of a particular mechanism, and the same holds true for the user of round hole cards. The cards cannot be interchangeably used in one type of mechanism, and, hence, a commercial establishment that wishes to change from one type of machine to another must either scrap or reproduce all of its original style cards, and substitute newly punched cards having perforations that will conform to the sensing mechanism of the newly adopted machines.

The use of a round hole is preferred, because the openings do not provide corners which are present in the slotted card and are more easily torn if the card is accidentally bent in handling, or in the normal course of sensing use. However, the diameter of the round hole that can be used is limited by the operating conditions of the mechanism. For instance, the use of a round hole of a diameter equal to the width of the slotted hole might be contemplated, but the edge of the hole would be the same distance from the sensing pin in columnwise direction, and any irregularity of the card or contraction or expansion therein, due to atmospheric conditions, in the direction in which the card is fed to, and arrested by, a stop in the sensing chamber, might not be allowed for in the restricted size of the holes with respect to the sensing pins. It is essential that the hole be made as large as possible, but a diameter larger than the width of the slot is not feasible because of overlap of the holes. It is not possible to place round holes at each slot position in horizontal alignment because of this overlap. As the sensing pins must be arranged to register with the slots of the card, the round holes of a card must be so arranged that they may also be sensed by the same sensing pins that register with the slots.

It is one of the important objects of the invention, therefore, to not only arrange round holes in a card in such relation to the perforations of a slotted card that either type of card can be sensed by the same sensing mechanism of a business machine, and to provide for an arrangement of round holes that will permit the use of a round hole of maximum diameter, but to also provide a sensing mechanism that can be incorporated in different business machines for sensing the perforations of either the round or slotted hole card.

It is another object of the invention to arrange the centers of the round holes with respect to the horizontal axes of rows of slots, so that the round holes may be punched in a card in horizontal rows that will accurately register with the relatively same horizontal rows of slots in a card having rectangular perforations; and to provide for the centers of the round holes with respect to the horizontal axes of rows of slots, so that the round holes may be punched in a card in horizontal rows that will accurately register with the relatively same horizontal rows of slots in a card having rectangular perforations; and to provide for the centers of the round holes of each horizontal row being sequentially offset or disposed a predetermined distance at opposite sides of a line that would constitute the horizontal axes of a row of slots, said distance being such that the major area of each hole lies within the boundaries of a slot area.

It is another object of the invention to provide a sensing mechanism that can be incorporated in machines for doing different work by deriving information from sets of cards of the round or slotted hole type that can be fed to the machine in interchangeable groups. As a simple example it might be desired to tabulate from each card of the different groups an interpretation of the data represented by the perforations. A machine of the type shown in Patent 2,044,119, granted to W. W. Lasker, June 16, 1936, may be employed, having the sensing mechanism shown herein, for tabulating the data perforated in round hole or slotted hole cards without the necessity for adjusting the mechanism to either type of card, specifically. The sensing mechanism may be incorporated in an interpreter of the type disclosed in Patent 2,311,471, granted to R. W. Ritzert, February 16, 1943, and the perforated data of the different types of punched cards can be sensed, interpreted and printed thereon. In order to obtain increased capacity of the novel round hole card disclosed herein, I may use the horizontal spaces between rows of index positions making up a complete card of one hundred and sixty columns to obtain another complete card of a like number of columns, so that the capacity of the card is three hundred and twenty columns. To handle this card in the machine an adjustment is provided that blocks the feed of a card while the one in the sensing chamber is advanced to a new sensing position against an adjustable stop member.

In the patent to Goerlitz, 2,054,811, alternate horizontal rows of aligned circular holes are offset relatively to each other for the purpose of increasing the capacity of the card, while applicant offsets the sequential holes of each row to carry out the objects of his invention. A slotted type card is shown in the patent to Lake, 1,772,492, but neither type of card illustrated in these patents can be sensed by the same mechanism, because the holes of each individual row of the Goerlitz patent, being aligned horizontally, could not be punched closely enough together without overlap, to register with the slots of the card shown in the Lake patent.

Various patents have been issued with particular hole arrangements, primarily for the purpose of increasing the perforated data capacity of the card, among which, a patent to Mills, 1,928,209, shows slots and round holes arranged between horizontal used data positions, but only one intermediate slot or round hole can be in any one column. The use, for instance, of a three hole code is precluded because the punchings in any one column might include an intermediate slot and overlap of the slots would occur.

Also Patent 1,623,164 to Carroll shows the use of staggered holes in rows for the purpose of increasing the capacity of the card. The holes of the card in this patent being equally spaced columnwise, would not register with the slots in any horizontal row of a slotted type card; and in a patent to Artana, 2,251,728, the intermediate rows of holes are punched after the card is turned over and trimmed along one edge. Both sets or groups of holes cannot be used at the same time and being equally spaced columnwise would not register with slots of a slotted type card.

This art has been referred to because the staggering of holes heretofore has been done primarily for the purpose of increasing the capacity of the card and the present invention while it staggers the holes, does so within certain limits that makes possible the employment of the single sensing mechanism disclosed herein that can sense either the slotted or round hole data in different cards.

Other objects and features of the invention will appear from the following description when read in connection with the accompanying drawings, in which.

This application is a continuation in part of application Serial No. 543,503, now abandoned, filed July 4, 1944, in the name of John T. Ferry for Perforated Record Card.

Figure 3:
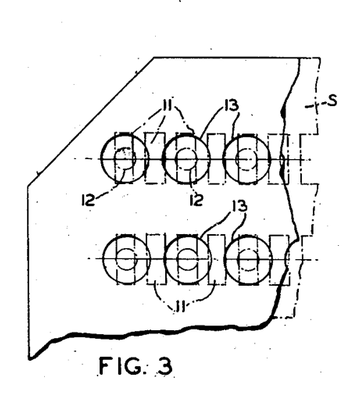
Fig. 3 is a diagrammatic plan view of a fragment of a round hole card in present use showing the relative positions of the rectangular openings employed in a slotted card at present in use.
Figure 4:
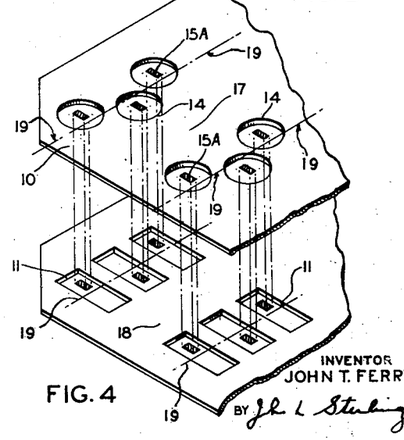
Fig. 4 is an exploded isometric view showing diagrammatically, the relation of sensing pins to the openings of a slotted card and the round holes of a registering card perforated in accordance with the present invention.
Figure 5:
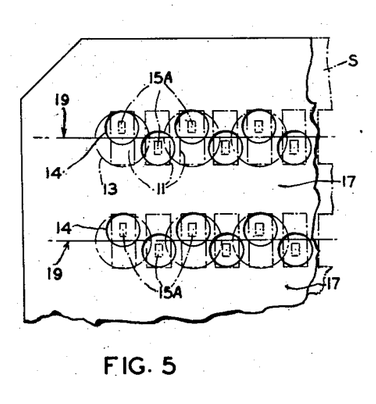
Fig. 5 is a plan view of an enlarged portion of a card punched with offset holes in each row and showing thereon, in outline, the difference in the novel arrangement of perforations with respect to the hole areas of cards in present use.
Figure 13:
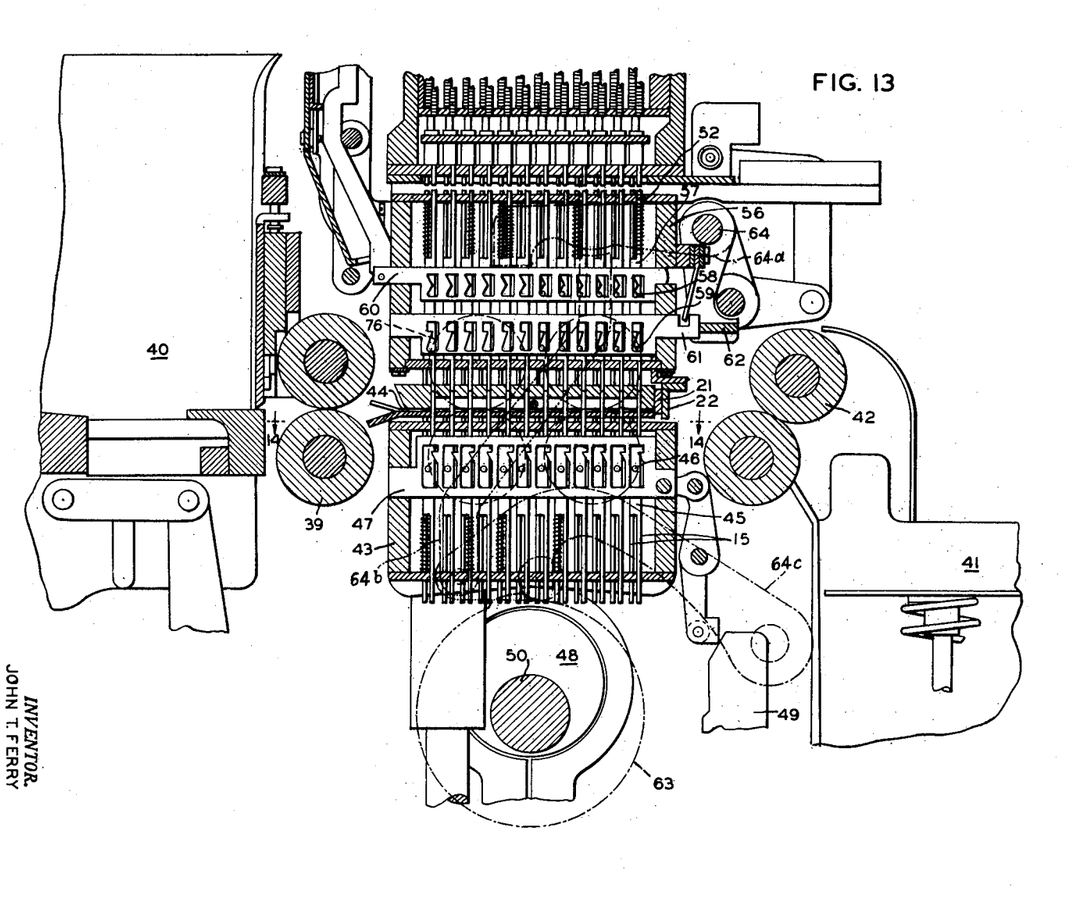
Fig. 13 is a view similar to Fig. 12 showing in section, the mechanism used in sensing the data from round and slot type cards.
Figure 14:
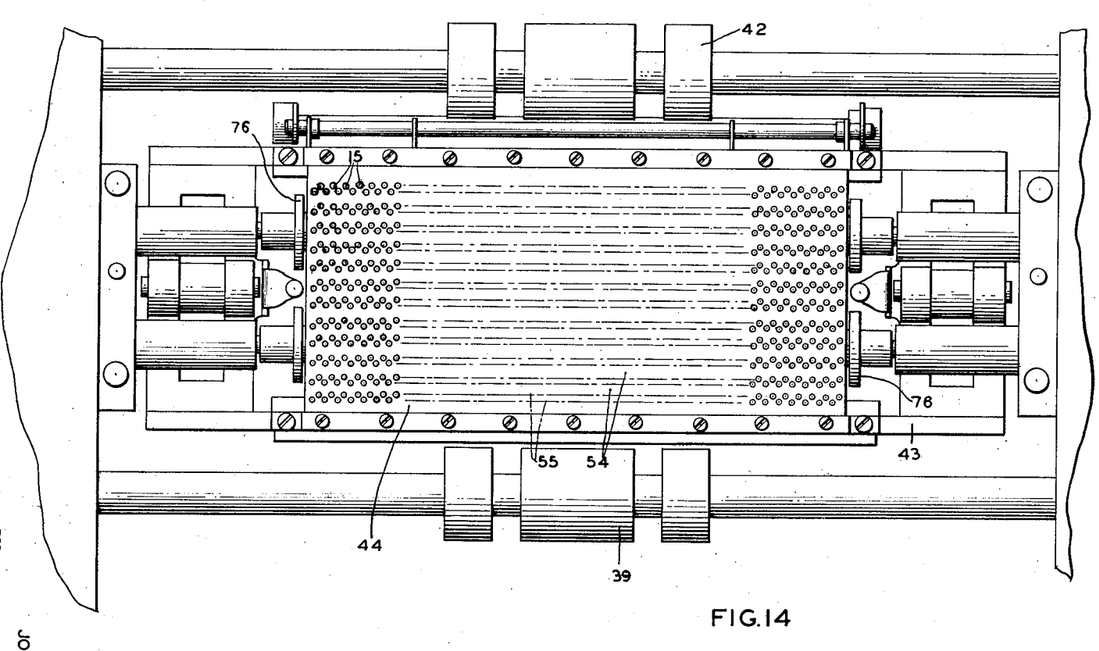
Fig. 14 is a plan view taken on the line 14—14 of Fig. 13 showing the arrangement of the rows of sensing pins.
Figure 15:
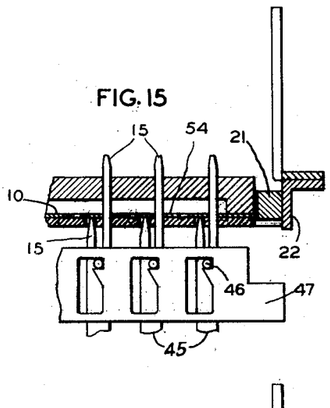
Figs. 15 and 16 are fragmentary views in section showing the card position adjusting operation of the stop.
Figure 16:
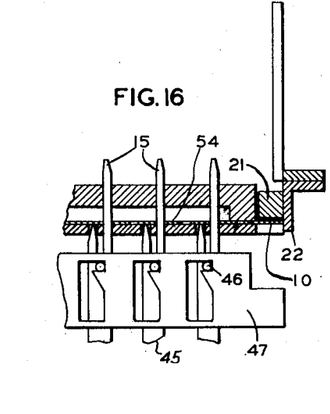

Referring to the drawings in detail, 10 indicates a perforated card having horizontal rows of data index positions arranged in vertical columns in which, at present, as shown in the fragmentary view of Fig. 3, holes representing a single letter or a single numeral are punched for the control of a business machine of the type known as "Powers." In this machine, sensing pins are aligned in horizontal rows to register with the index positions of the card, so that control of the machine is afforded by the round holes in the card. As shown diagrammatically in Fig. 3, a card having slotted holes 11 would not control this machine, because the slot areas are too close together in horizontal alignment to register with the sensing pins 12 which are spaced to sense the round holes 13. In the diagrammatic comparison of the slot areas and the round holes in Fig. 3, horizontally aligned round holes of necessary diameter cannot be punched for each slotted hole area because of overlap and, as shown in Figs. 4 and 5, the card is arranged with round holes 14 of a minimum diameter that can be sensed by the sensing pins 15A. The pins of the sensing mechanism may be round (15) or rectangular (15A) in cross sectional shape and are arranged in sequentially staggered arrangement in horizontally extending rows, so that consecutive pins may sense in the opposite ends of the slot areas 11. The arrangement of the pins and their operating mechanism are shown in Figs. 13 and 14, but in Fig. 4, the pins are shown diagrammatically to bring out the relationship between said pins, the slot areas, and the novel arrangement of round holes set forth herein.

It is deemed advantageous to bring out the structure of the card first in order that the sensing mechanism that is employed to handle it can be explained with reference to the different types of cards sensed.

For convenience of illustration only, an imaginary center line 19 is shown in many of the figures which constitutes a median line or axis passing horizontally through the slot areas 11, the latter being also shown diagrammatically. A novel arrangement of circular hole positions in each row is provided with relation to said median line 19 by offsetting the centers of the circular holes 14 alternately at opposite sides of this median line or horizontal axis, so that the sequential holes of each horizontal row are offset and the major area of each round hole falls within the slot area 11. The centers of the holes constitute the data index positions in each horizontal row. If a slotted card S is placed beneath, and in register with, as in Figs. 4, 5, 7 and 8, a card having round holes 14, it will be found that the sequential round holes in any horizontal row coincide with the upper and lower portions of the slots, respectively, and that the holes of both cards will register with the sensing pins 15 or 15A. While both cards would not be sensed simultaneously, it is evident that the holes in either could be sensed by the same sensing pins.

Figure 11:
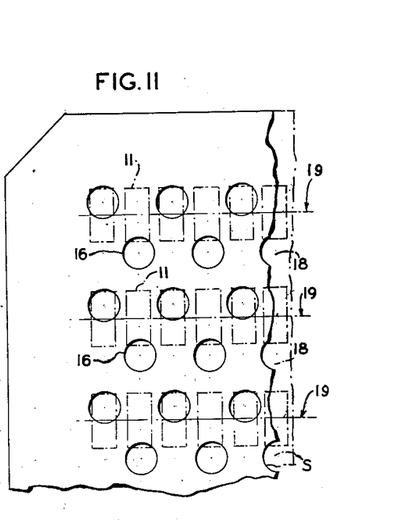
Fig. 11 is a fragmentary portion of a card with the holes shown evenly spaced and in diagrammatic relation with slots of a registering card of slotted type.

Consequently, the factor that determines the location of the round holes 14 in each horizontal row is the relation of their centers to the imaginary horizontal median line 19 of each row that passes through the slot areas 11 and constitutes the minor axis of the slotted holes in each row. Cards, so punched with round holes, can be sensed in the machine in which sensing pins are arranged to sense the slotted card. The relation of the position of the round holes to the median line 19 of each row of slots is brought out in a comparison of Figs. 5 and 11. In Fig. 5, it will be evident that the lower holes of the upper row are closer to the upper holes of said upper row than they are to the upper holes of the next lower row, leaving clear zones 17 between the horizontal rows of holes 14. In Fig. 11, if the lower holes 16 of the upper row are positioned midway between the upper holes of the upper and lower rows, as is the common practice in the staggering of holes or rows, for the sole purpose of increasing the capacity of the card, as shown in the patents referred to herein, they would not register with the slot areas 11 and, consequently, could not be sensed by the same sensing mechanism that would sense the slots. It is important that the centers of the round holes 14 be arranged within a predetermined distance of, and at, opposite sides of the median line 19, sequentially, so that the major area or portion of each hole 14 falls within the confines of a slot area.

Figure 1:
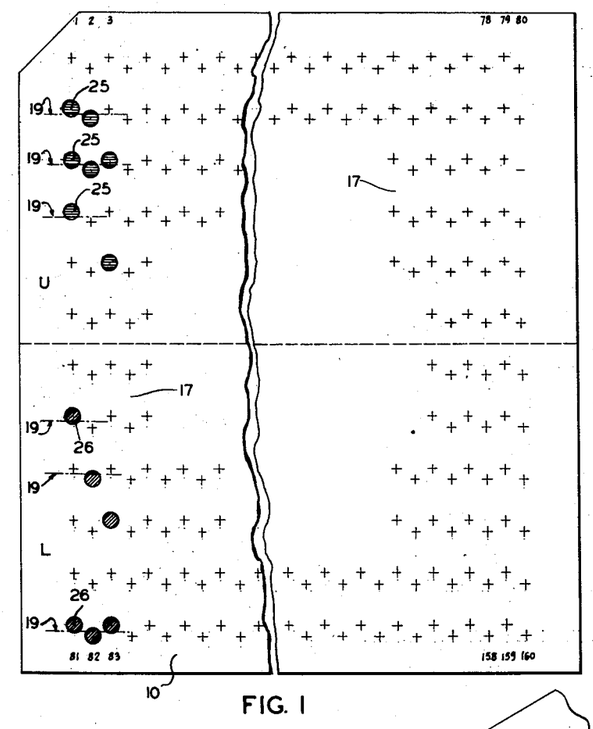
Fig. 1 is a plan view of a card showing code data perforated therein and having data index positions arranged in accordance with the present invention and providing one hundred and sixty columns of index data.
Figure 2:
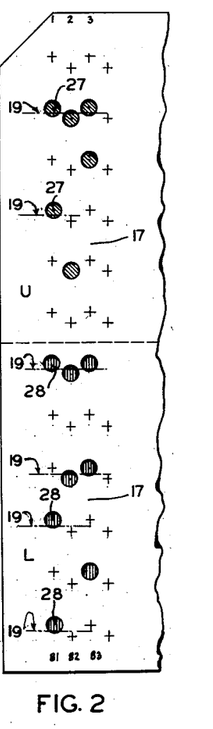
Fig. 2 is a view similar to Fig. 1 showing a fragment of a like card with different code data perforated therein.
Figure 6:
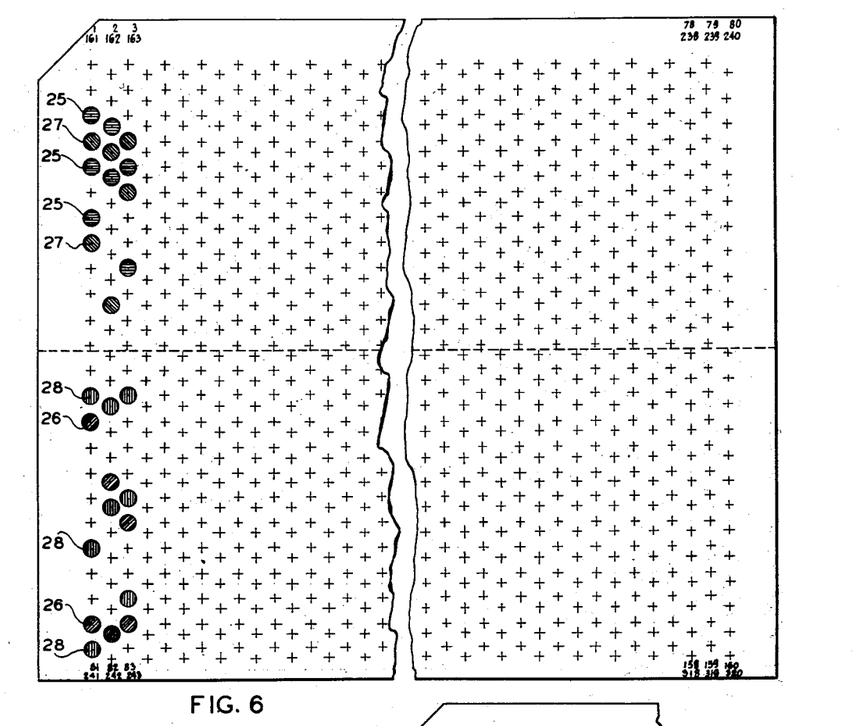
Fig. 6 is a plan view of a card showing the use of additional rows of index positions providing a card having three hundred and twenty columns of index data, and containing the combined data perforations of the cards shown in Figs. 1 and 2.
Figure 7:
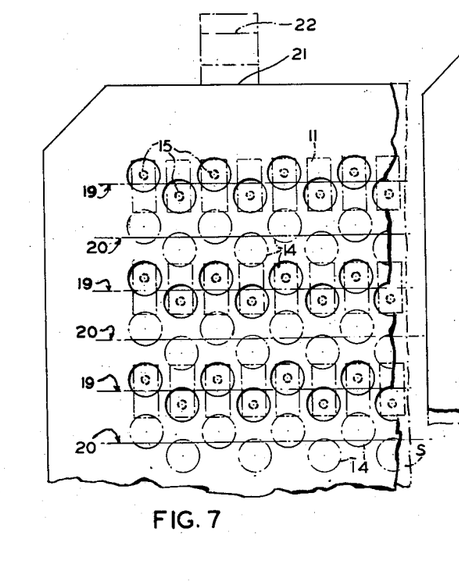
Fig. 7 is a view similar to Fig. 5 showing the arrangement of the holes in a three hundred and twenty column card, with respect to the sensing pins the card being in first sensing position.
Figure 8:
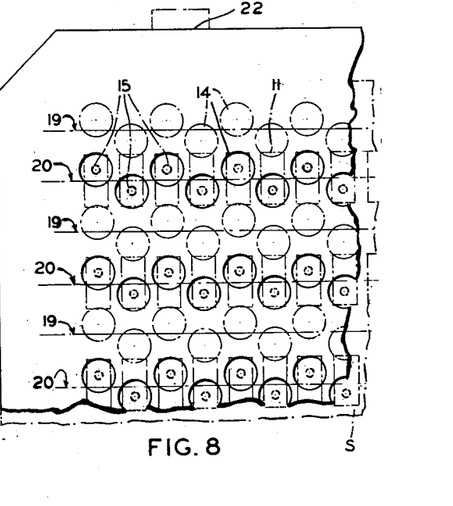
Fig. 8 is a view similar to Fig. 7 illustrating the relation of the sensing pins to the alternate rows of holes when the card is moved to a second sensing position.

In a standard slotted hole card, the slots 11 are vertically spaced about a distance equal to the length of the slot, leaving a space 18 between columnwise adjacent slots as shown in Figs. 4 and 11 that is too small to permit the punching of an intermediate slot. The slotted card is limited to a single group of slots arranged in twelve horizontal rows providing eighty columns of twelve positions per column, and a round hole card 10 that can be sensed by the same mechanism has a like arrangement of holes. However, with the offset arrangement of the round holes in each horizontal row as described, the zones 17 provide sufficient space on the card between the rows of holes 14 identified with the median lines 19, as seen in Figs. 1, 2, and 4, to permit the use of another complete set of round holes as shown in Figs. 6, 7, 8, and 10, thus doubling the capacity of the card. The extra or second set of holes is also arranged in horizontal rows, the holes of each row being located alternately at opposite sides of a median line 20 disposed intermediate the median lines 19 of the holes of the first set. The second set of holes is so arranged that, when the card is moved columnwise to a second stop position 22 (Figs. 7, 8, 15 and 16), it is sensed by the same sensing pins 15 that sense the first set of round holes in the same or similarly perforated cards, or that sense the holes of the slotted card when the cards are positioned at an initial stop position 21 for first sensing. Thus, with a three position code employing only six vertical positions in a column, the single group of card as illustrated in Figs. 1 and 2 gives an upper zone U and a lower zone L of eighty columns each, or a one hundred and sixty column capacity card. With the added rows of holes identified with the median line 20 providing an extra set or group of hole positions, each zone U and L accommodates one hundred and sixty columns and the entire card, as shown in Fig. 6, three hundred and twenty columns, or about three and one half times the capacity of the standard ninety-column round hole card in present use, as illustrated in Patent 1,780,621.

Figure 9:
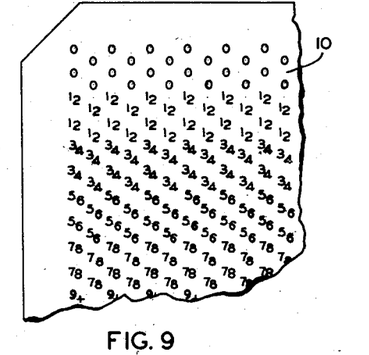
Fig. 9 is a view of a fragment of a card of the type shown in Fig. 6 showing one form of data index position markings.

While the data index positions are shown in various figures of the drawings as hole outlines or crosses, it is evident that numerals, letters, or other identifying indicia may be employed as in Fig. 9, that will generally assist in locating on the face of the card 10, the row and column locations of the data index positions.

The use of the same pins for sensing the different sets of holes, arranged in alternate, horizontally extending rows of staggered holes, identified with the median lines 19 and 20, reduces the number of pins that would be required in sensing the aligned holes of relatively staggered rows of holes as in the Goerlitz patents referred to, it being pointed out that the holes 14 of the present invention in each row are relatively staggered, each row beginning the same distance from the left edge of the card and extending horizontally across the card to end the same distance from the right edge thereof. Applicant staggers the sequential holes of each row, but does not stagger the rows relatively to each other. While the rows of holes have heretofore been staggered for the purpose of increasing the capacity of the card, the staggering of holes of each row, as in the present invention, is done for the purpose of producing a card, the round holes 14 of which will equal or exceed in number, the slots 11 of the slotted hole card. The round hole card can be sensed by a sensing pin arrangement shown in Figs. 13 and 14, that will also sense said slotted hole card. Reference to Fig. 6 will show that in a single column of the card, holes for four different characters can be punched. For purposes of explanation, in the first vertical left hand column, the code holes 25 (horizontal cross hatching) are for the letter J, holes 23 (45° cross hatching) for the numeral 2, holes 27 (45° cross hatching) for the letter B and holes 28 (vertical cross hatching) for the letter N. In the one hundred and sixty column card illustrated in Fig. 1, the letter J (holes 25) and numeral 2 (holes 26) are punched in the first column and in a second or similar card shown in Fig. 2, the letters B (holes 27) and N (holes 28) are punched in the first column. The subject matter of the two one hundred and sixty column cards shown in Figs. 1 and 2 can consequently be punched in the single three hundred and twenty column card shown in Fig. 6, thus effecting a considerable saving in the number of cards, the manual handling thereof, and the amount of filing equipment necessary. In view of the fact that the card need only be moved from a first sensing location to a second, to enable the same sensing pins to control the machine in tabulating the data from the cards, the wear on the latter is reduced by the lesser amount of travel necessary through the machine per quantity of data taken from each card by the machine.

Figure 10:
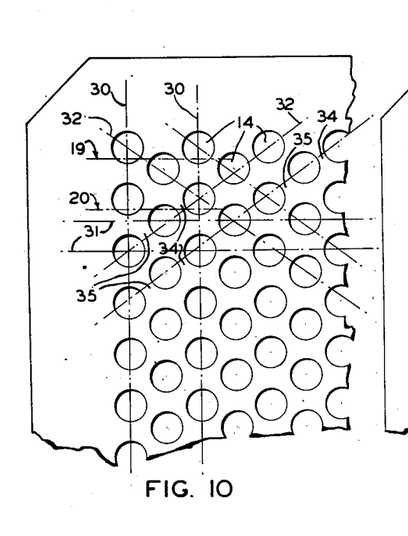
Fig. 10 is a view of a fragment of a card showing the relation of the holes as affecting the rigidity and strength of the card.

The staggering of the holes 14 of each horizontal row in prearranged relation to the median lines 19 and 20 that pass horizontally through the perforations of a slotted card, produces a unique spacing of the holes that materially adds to the strength and rigidity of the card. As shown in Fig. 10, the oblique lines 32 drawn through the centers of some of the holes of the card cross narrow and wide portion 34 and 35, respectively, of the card between the holes 14, and the amount of card stock in said wide and narrow portions varies along the oblique lines because these lines cannot be drawn through the centers of all the holes in oblique direction. The novel spacing of the holes prevents alignment thereof along said oblique line 32. A maximum amount of stock separates the holes along the vertical and horizontal lines 30 and 31, respectively, and because of the unaligned arrangement of the holes obliquely and the difference in the amount of card stock between holes, the card will not bend as readily along a straight line in oblique direction as will a card having a like number of holes which are equally spaced and are aligned in all directions, which is the case when staggered holes are arranged the same distance from each other.

The mechanism by which the cards are passed through a machine and sensed consists of card supply and discharge receptacles 40 and 41 respectively with their associated feed rolls 39 and 42 disposed at opposite sides of a card or sensing chamber 44 intermediate an upper pin box 56 and a lower pin box 43 in the latter of which are yieldably mounted the spring pressed sensing pins 15. The pins have flat portions 45 from which project the lock studs 46 for engagement with the locking slides 47 to lock the sensing pins that find holes in the card immovable with respect to the pin box 43. As the latter rises under influence of the eccentric 48, driven by main drive shaft 50, the locking slides 47 moving to the left in Fig. 13 under influence of cam 49 will lock up the pins that have sensed holes in the card. Continued upward movement of the pin box 43 is transmitted to the "set" pins 52 which operate Bowden wires or other transfer mediums, 53, to transmit the data indicated by the perforations to suitable stop means, which in turn, control the operation of printing means as shown in Patent 2,044,119. The flat portions of the pins 15 are in alinement, but the pin extensions thereof are alternately offset to provide a sensing pin arrangement as illustrated in Fig. 14, which arrangement coincides with the arrangement of the sensing pins in Fig. 4 and with either a round or a slot-shaped hole located at any data designation position. The description of the location of the data index positions of the card is also a description of the location of the sensing pin and it is not deemed necessary to repeat or show the use of a median line in connection with the pin arrangement as it has been disclosed in Fig. 4. The factor that determines the location of the pins 15 in each horizontal row 55, Fig. 14, is the relation of their centers to the imaginary horizontal median line 19 of each row that passes through the slot areas 11 of a slot type card disposed in the sensing chamber 44 at normal sensing position or against stop 21; the line 19 constituting the horizontal or minor axis of the slotted holes in each row of the card. When the three hundred and twenty column round hole card is in either first or second sensing position due to an adjustable stop mechanism to be later explained, alternate horizontal rows of holes therein will be in register with the sensing pins (Figs. 15 and 16), and the intermediate rows of holes will register with the clear spaces 54 between each row 55 of sensing pins 15.

The spring pressed set pins 52 are held in the upper stationary pin box 56 and are provided with flat portions 57 from which project the studs 58 and 59 for "set" engagement respectively with the cam or designation slides 60 and latch plates 61. The sensing pins 15 and set pins 52 are shown in Fig. 13 as they appear when the card chamber is empty, the sensing pin springs being weaker than the set pin springs as explained in Patent 2,044,119. At intervals, the pins 52 that have been "set" are released by the latch plates 61 operated by a suitable retract bail 62 mounted on a rock shaft 64, which is actuated through the arm 64a, link 64b and lever 64c by the retract cam 63 as shown diagrammatically in Fig. 13 and fully illustrated in Fig. 18 of Patent No. 2,237,908.

Figure 12:
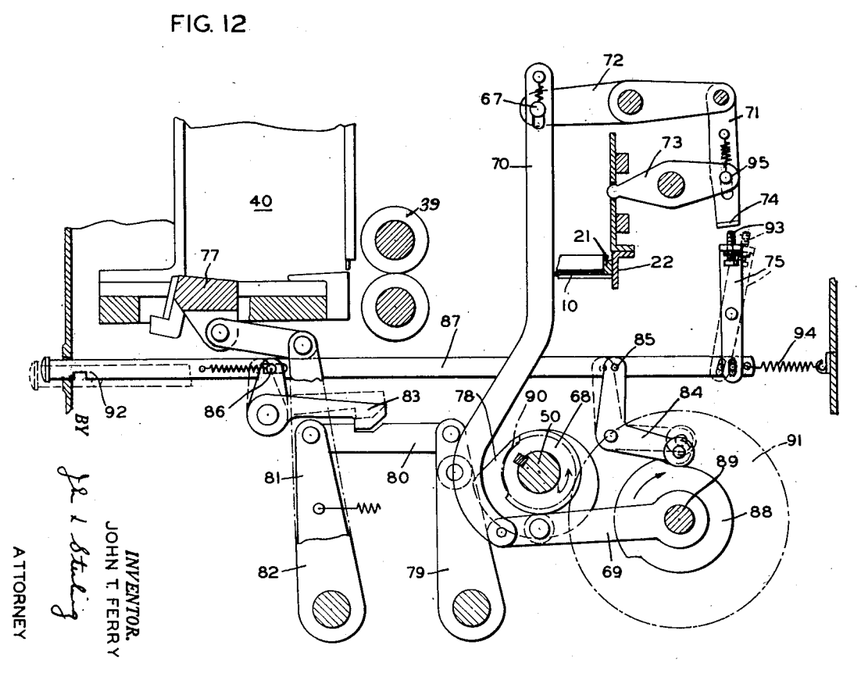
Fig. 12 is a view in sectional elevation taken at the right side of a tabulator, illustrating the controls for feeding and positioning cards.

When either a slotted type card or a round hole card is fed from magazine 40 by feed rolls 39 it is arrested in the card chamber 44 by a two-position stop mechanism which includes a stop bar 22 spring urged to closed position and carrying a stop block 21 thereon which arrests the card at a first sensing position. The stop operating means includes a card stop cam 68 (Fig. 12) on shaft 50 for moving a cam arm 69 once in each cycle of machine operation to open and close the stop 22 through the medium of the vertical links 70 and 71 and the rock arms 72 and 73. Link 70 has a yieldable pin and slot connection 67 to arm 72 and link 71 presents a foot 74, for engagement with a stop detent 75 which, when beneath the foot 74, prevents full opening movement of the stop and positions the stop bar 22 in the path of the card so that when the latter is advanced by the skid rolls 76 it will bring the alternate rows of the second group of round holes into register with the sensing pins as clearly shown in Figs. 7, 8, 15, and 16. When a group of cards such as illustrated in Fig. 1, upon which one set of data index positions is depicted, is passing through the machine, the stop opens and closes fully once in each cycle of machine operation; this being also true for a slotted card group or an indiscriminate mixture of the two. The cards are fed in to the card chamber, are sensed and pass to the discharge rolls for stacking in the discharge receptacle 41. When cards having two groups of round holes as illustrated in Fig. 6, are to be sensed it is necessary to adjust the stop mechanism so that it will automatically detain each card for a cycle so that the holes of the first group thereof will register with the sensing pins and then in the next cycle of machine operation cause the stop to hold the card so that the holes of the second group thereof will register with the sensing pins. On the third cycle of machine operation the card is released and goes to the bin 41. Adjustment of the stop automatically controls the feed of the cards by disabling the card picker 77 which is normally operated by the picker cam 78 to feed one card in each cycle. This disablement of the picker is caused by withholding the picker operating linkage 79, 80, 81, 82 with a detent 83 whose operation is controlled by a cam actuated bell crank 84. The detent 83 has a spring pressed pin and slot connection 86 with an adjusting link 87. The picker and stop adjusting cam 88 mounted on stud shaft 89 is driven from the main shaft 50 through gears 90 and 91 having a three to one ratio, respectively so that cam 88 revolves once for every three revolutions of main shaft 50. A notched manual push rod 92 extending to the exterior of the machine is used for holding the bell crank 84 out of reach of cam 88, when cards having one set of holes are being put through the machine, and when the rod 92 is at the "out" position, as shown in outline in Fig. 12, it holds the link 87 in its leftward position which keeps detent 83 disabled and permits regular cyclic operation of the card feed mechanism under influence of cam 78. At this position of link 87 the stop detent 75, carrying an adjusting screw 93 in a turned end thereof, is thrown from beneath the footed end 74 of vertical link 71 and the stop linkage can have a normal full stop opening movement in each cycle. When cards having a double set of holes are to be fed to the machine, the pull rod 92 is lifted and snaps "in" under influence of its spring 94 and drops the bell crank 84 to cam engaging position and moves the link 87 to the right (Fig. 12) with the result that detent 83 is positioned to engage link 80. Cam 88 has a low dwell for two thirds of its circumference and a high dwell for the balance and during two cycles of machine operation, or two rotations of main drive shaft 50 the cam crank 84 will engage the low of cam 88 and as shown in Fig. 12 will position link 87 to the right to engage detent 83 to prevent card feed and to throw stop arm 75 beneath link 71 to limit the opening movement of the stop so that the block 21 will move up out of card detaining position and stop 22 will then be in position to arrest the card after the latter has been pushed to the rear of the card chamber by the skid rolls 76, a distance necessary to bring the second group of holes into register with the sensing pins. When the high portion of cam 88 rocks bell crank 84, the latch 83 is removed from detent position and the stop arm 75 is thrown out of the path of the link 71 which descends the full travel to open the card stop completely and let the card pass out of the chamber. Use of a yieldable pin and slot connection 95 between link 71 and arm 73 allows closing movement of the stop linkage when the card is beneath block 21 and against stop bar 22, without damage to the card.

In the operation of the mechanism, when sensing of either round or slotted hole cards is taking place, a card is picked up at about 30 degrees of movement of shaft 50 and is fed into the sensing chamber against the stop 21 which opens at about 120 degrees to release the previous card and closes at about 200 degrees to hold the new card for sensing. The pins 15 sense the new card at about 240 degrees and the data set up of the previous card is retracted at about 325 degrees, and in the next cycle, the card stop releases the card. The card is held in the sensing chamber for one cycle when one group of holes is to be sensed, but is held an additional cycle when the two different groups in the same card are to be sensed. In the second cycle when the cam 68 allows the card stop to open, its full opening movement is blocked by the member 75 controlled from cam 88 and as the card is advanced from stop 21 to 22 the two different groups of holes can be sensed without the necessity of making two separate runs of the cards through the machine. During the two sensing cycles the operation of the card feed and card stop opening mechanism is stayed and hence by a simple manual adjustment, the machine can be conditioned to sense one hundred and sixty column round or slotted hole cards and three hundred and twenty column round hole cards.

It is evident, therefore, that the invention contemplates the sensing of cards having either round or slotted holes by producing a card having a novel round hole arrangement and by also providing a sensing mechanism for sensing either type of perforated card. The novel arrangements of the holes with respect to a horizontal location affording spaced rows of staggered holes, that have their major area within what would be the area of a slotted hole, if two such cards were brought into register, produces a card of greatly increased capacity. Further, a card is produced that will resist bending in any direction by the arrangement of the holes thereof, so that the holes will be separated by a maximum amount of cardstock.

While I have described what I consider to be a highly desirable embodiment of my invention, changes in form may be made without departing from the spirit of the invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. A card for controlling the operation of a business machine adapted to be governed by cards of either the round or slotted hole type, said card presenting horizontal rows of hole index positions, the positions in each row being disposed sequentially at opposite sides of an imaginary line constituting the horizontal axis of a row of slot positions in a registering card of the slotted type, and said hole positions falling within the slot areas of said slot positions.

2. A card for controlling the operation of a business machine adapted to be governed by cards of either the round or slotted hole type, said card presenting horizontal rows of hole index positions, the positions in each row being disposed sequentially at opposite sides of and equal distances from an imaginary line constituting the horizontal axis of a row of slot positions in another card of the slotted type brought into register therewith.

3. A card for controlling the operation of a business machine adapted to be governed by cards of either the circular or slotted hole type, said card presenting horizontal rows of data index positions defining circular hole centers, said positions in each row being disposed sequentially at opposite sides of an imaginary line constituting the horizontal axis of a row of slot positions in a registering card of the slotted type and said positions falling within the boundaries of slots located by said slot positions.

4. A card for controlling the operation of a business machine adapted to be governed by cards having circular or slotted control holes, said card presenting horizontal rows of data index positions defining round hole locations, said positions in each row being disposed sequentially a predetermined distance at opposite sides of an imaginary line constituting the horizontal axis of a row of slot positions in a registering card of the slotted type, whereby the major area of a circular hole perforated in any of said positions will lie within the area of a slot in register therewith.

5. A card for controlling the operation of a business machine adapted to be governed by cards having circular or slotted control holes, said card presenting horizontal rows of data index positions defining round hole locations, said positions in each row being disposed sequentially predetermined distances at opposite sides of an imaginary line constituting the horizontal axis of a row of slot positions in a registering card of the slotted type, whereby the center of a circular hole perforated in any of said positions is within the area of a slot in register therewith.

6. A card for controlling the operation of a business machine adapted to be governed by cards of either the round or the slotted hole type, said card presenting horizontal rows of hole index positions, the positions in each row being disposed sequentially at opposite sides of an imaginary line constituting the horizontal axis of a row of slot positions in a registering card of the slotted type, and the vertical spacing between the horizontal rows being greater than the vertical spacing between the hole positions of each row to provide clear zones between said rows.

7. A card for controlling the operation of a business machine adapted to be governed by cards having round or slotted control holes, said card presenting horizontal rows of hole index positions, the positions in each row being disposed sequentially at opposite sides of an imaginary line constituting the horizontal axis of a row of slot positions in a registering card of the slotted type and the vertical spacing between the horizontal rows being greater than the vertical spacing between the hole positions of each row and providing clear zones between said rows when the card is in one sensing position and another set of hole index positions located in each of said zones for increasing the capacity of the cards.

8. A card for controlling the operation of a business machine adapted to be governed by cards of either the round or slotted hole type, said card presenting horizontal rows of hole index positions, the positions in each row being disposed sequentially at opposite sides of an imaginary line constituting the horizontal axis of a row of slot areas in a card of the slotted type brought into register therewith, and said index positions being unaligned obliquely of the card whereby holes perforated at said positions will be separated by varying amounts of card stock.

9. A card for controlling the operation of a business machine adapted to be governed by cards of either the round or slotted hole type, said card presenting horizontal rows of hole index positions, the positions in each row being disposed sequentially at opposite sides of an imaginary line constituting the horizontal axis of a row of slot areas in a card of the slotted type brought into register therewith, and said index positions being out of alignment in directions obliquely of the card whereby holes perforated at said positions are separated by alternate wide and narrow amounts of card stock in said oblique direction for increasing the resistance of the card to bending along said holes.

10. A card for controlling the operation of a business machine adapted to be governed by cards having round or slotted holes, said card presenting horizontal rows of hole index positions for initial sensing, the positions in each row being disposed sequentially at opposite sides of an imaginary line constituting the horizontal axis of a row of slot positions in a card of the slotted type brought into register therewith, the vertical spacing between the horizontal rows being greater than the vertical spacing between the hole positions of each row and providing clear zones between said rows, and an additional row of hole index positions for secondary sensing located in each of said zones for increasing the capacity of the card.

JOHN T. FERRY.

REFERENCES CITED

The following references are of record in the file of this patent:

UNITED STATES PATENTS

| Number | Name | Date |
|---|---|---|
| 1,769,022 | Goerlitz | July 1, 1930 |
| 1,984,516 | Brougham | Dec. 18, 1934 |
| 2,027,916 | Lasker | Jan. 14, 1936 |
| 2,054,811 | Goerlitz | Sept. 22, 1936 |
| 2,324,438 | Thomas et al. | July 13, 1943 |